United States Patent

[11] 3,616,442

| [72] | Inventors | Wayne S. Cheng;<br>Peter R. Johnston, both of Neenah, Wis. |
|---|---|---|
| [21] | Appl. No. | 884,281 |
| [22] | Filed | Dec. 11, 1969 |
| [45] | Patented | Oct. 26, 1971 |
| [73] | Assignee | Kimberly-Clark Corporation<br>Neenah, Wis. |

[54] ELECTROCHEMICAL CELL HAVING GAS
DIFFUSION ELECTRODE
8 Claims, 6 Drawing Figs.
[52] U.S. Cl. .................................................. 204/257,
204/83, 204/263, 204/265
[51] Int. Cl. ........................................................ B01k 3/00,
C01b 15/00
[50] Field of Search ............................................. 204/257,
258, 263, 265

[56] References Cited
UNITED STATES PATENTS

| 2,273,798 | 2/1942 | Heise et al. ................... | 204/82 |
| 3,462,351 | 9/1969 | Grangaavd ................... | 204/83 |
| 3,506,560 | 4/1970 | Grangaavd ................... | 204/263 |
| 3,507,769 | 4/1970 | Grangaavd ................... | 204/265 |

*Primary Examiner*—F. C. Edmundson
*Attorneys*—Daniel J. Hanlon, Jr. and Raymond J. Miller ABSTRACT: An electrochemical device particularly including an electrolytic cell adapted for peroxide production. The device has a unitized insert electrode structure for mounting in an outer electrolyte retaining casing. The unitized insert electrode structure is adapted to provide a dual cell arrangement including planar cathodes each of which has a separate cooperating anode and semipermeable diaphragm. The flow path of electrolyte in each cell is into an anode chamber, through the semipermeable diaphragm to the cathode chamber over the cathode surface and out of the cell.

ELECTROCHEMICAL CELL HAVING GAS DIFFUSION ELECTRODE

BACKGROUND OF THE INVENTION

1. Field of the Invention

This invention relates to electrochemical devices adapted for peroxide production. More specifically, this invention relates to an arrangement of components of an electrolyte cell or cells in a unitized structure adapted for insertion in a casing capable of retaining electrolyte. Still more specifically, the invention relates to an electrolyte cell structure for peroxide production in which electrolyte flow is substantially unidirectional.

2. The Prior Art with Relation to the Invention

The construction of electrochemical devices in the nature of electrolytic cells tends to be complicated due to a number of factors. Such include the necessity for provision of various inlets and outlets governing electrolyte movement, and arrangements for electrode replacements. Additionally, in cells for peroxide production provision must be made for the introduction to the cells of oxygen-containing gases and for expulsion of exhaust gases. These requirements, plus considerations of adequate electrical connections to the electrodes, not only tend to complicate the structure but make the upkeep relatively costly since electrode life is usually distinctly limited.

We have found that a unitized electrode structure may be conveniently provided for insertion in a casing adapted for electrolyte retention, and that such insert may be quickly and easily replaced when the electrodes have approached the end of their useful life. We have also found that such insert electrode structure may, in a preferred embodiment of the invention, include a pair of planar cathodes which define between them an air chamber for the supply of oxygen to the cells.

Also in the operation of the electrochemical device of this invention electrolyte flow in a cell in the production of peroxide is unidirectional and from the anode through a semipermeable diaphragm over the cathode face to an outlet.

PREFERRED EMBODIMENTS OF THE INVENTION

Figure 2:
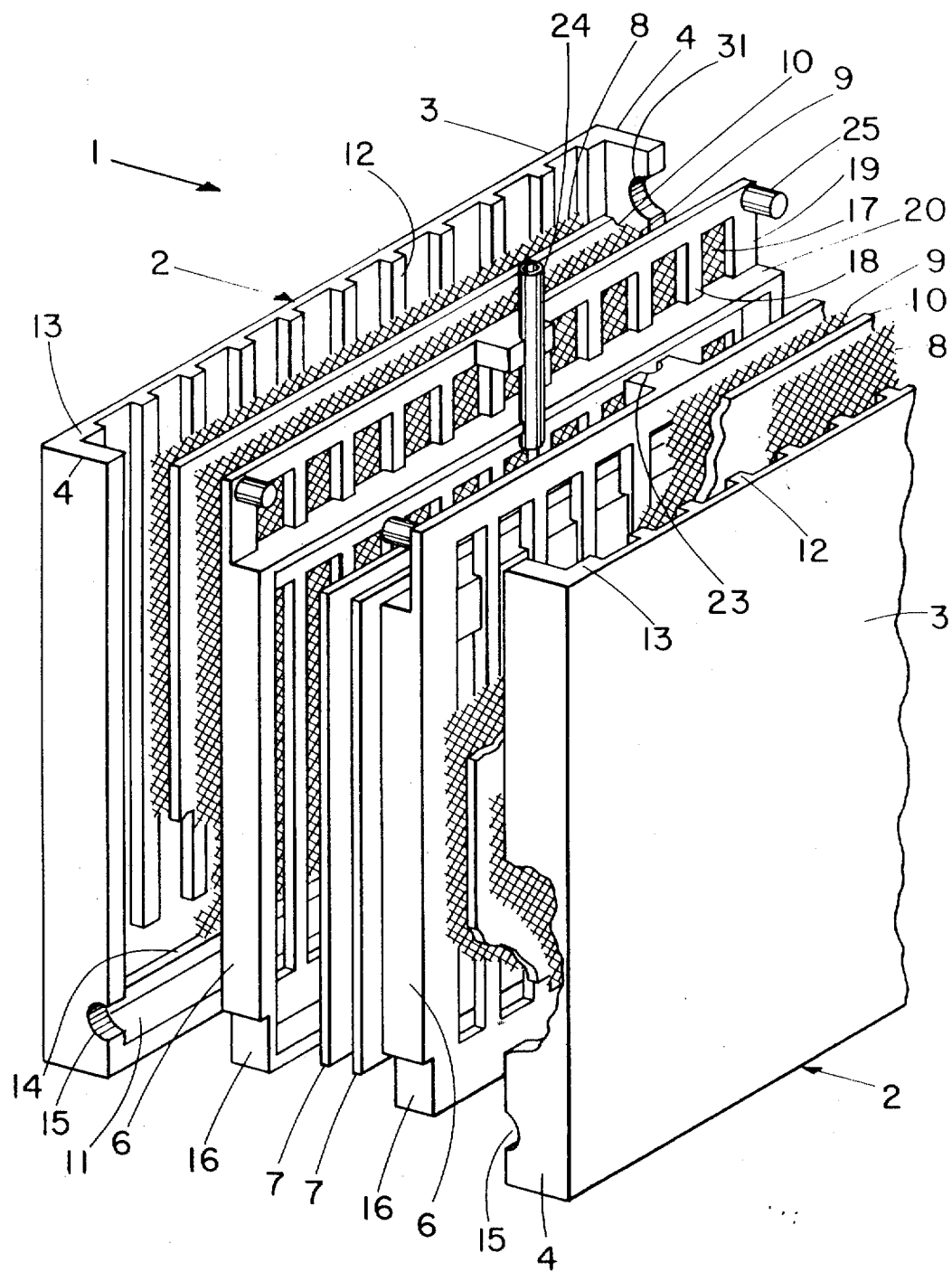
FIG. 2 is a fragmentary view illustrating the arrangement of component parts for an electrochemical device in accordance with the invention.
Figure 3:
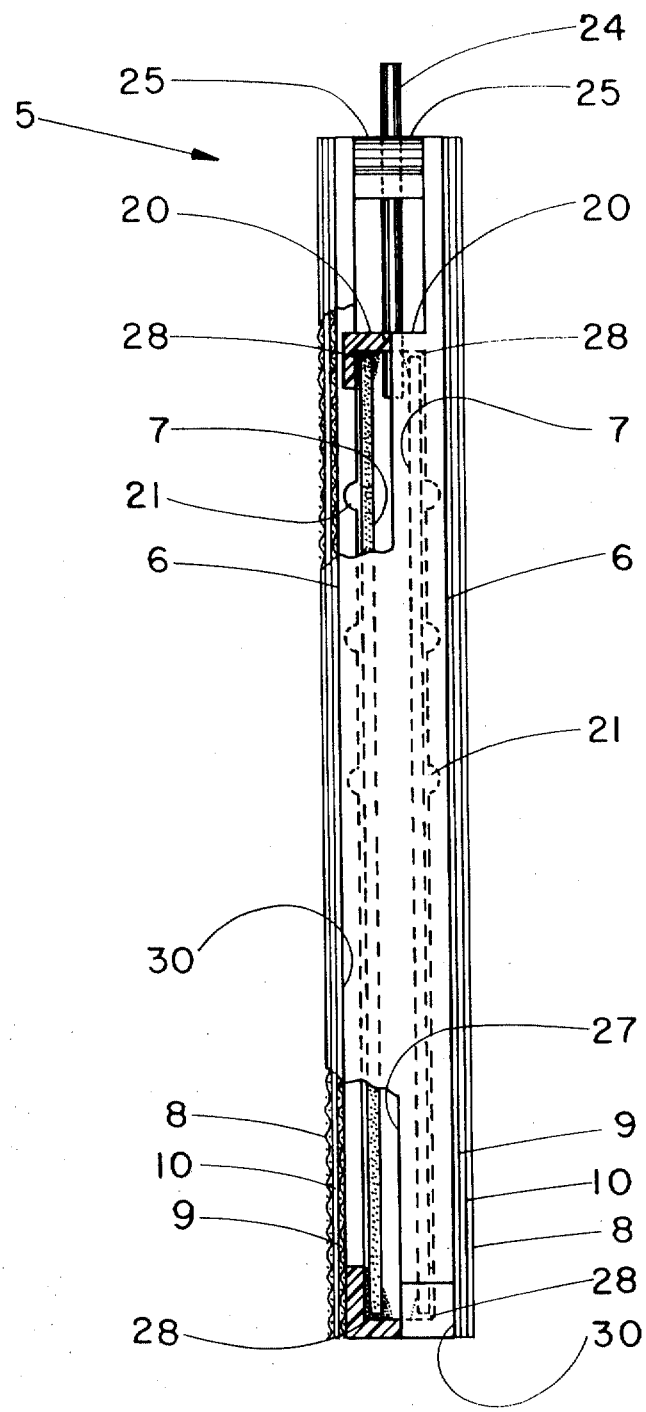
FIG. 3 is an enlarged elevational view partially in section illustrating a unitized insert electrode structure.
Figures 4, 5:
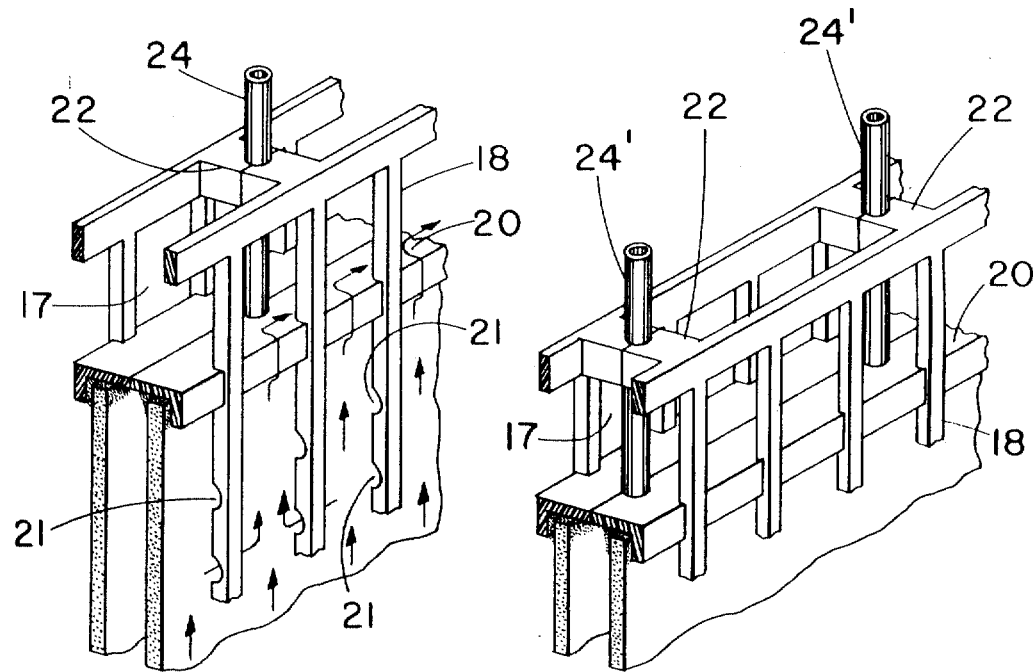
FIGS. 4–6 inclusive are fragmentary views illustrating structural arrangements useful in devices such as those illustrated in FIG. 1.

Referring first to FIGS. 2-4 inclusive, the numeral 1 in FIG. 2 generally designates the electrochemical device which, in this instance, has a pair of electrochemical cells. The device 1 includes a casing generally indicated by the numeral 2 and having complementary parts which include rectangular longitudinally extending walls 3 and opposed end walls 4. The numeral 5 (FIG. 3) generally designates the unitized insert electrode structure which is mounted within the casing. Insert electrode structure 5 is comprised of a pair of frames 6 (FIG. 2) each of which is adapted to seat and retain one platelike rectangular gas diffusion cathode 7. Suitably, such cathode is of porous carbon composition. Also, each frame 6 on the side of the frame remote from the cathode supports nickel wire mesh electrolyte permeable anode 8. Additionally, each frame 6 between the anode and the cathode on the side of the frame remote from the cathode is provided with a plastic, liquid-permeable supporting mesh 9. A semipermeable membrane 10 is in contact with the anode and supported between the anode and the plastic mesh 9. As may be more clearly seen from FIG. 3, each cathode 7 and a cooperating anode 8 and semipermeable membrane 10 form one cell of the unitized insert electrode structure, the electrode structure being arranged for convenient mounting within the casing 2.

Referring again to FIG. 2, it will be noted that longitudinally extending sidewalls 3 are provided with vertically extending ribs 12 which engage the insert electrode structure and provide spacings between the ribs for electrolyte flow along the semipermeable diaphragm and anode face. The insert electrode structure at the corners is spaced also by corner protrusions 13 and the insert electrode structure mounts on a horizontally extending ledge means 14 of the casing portion.

Figure 6:
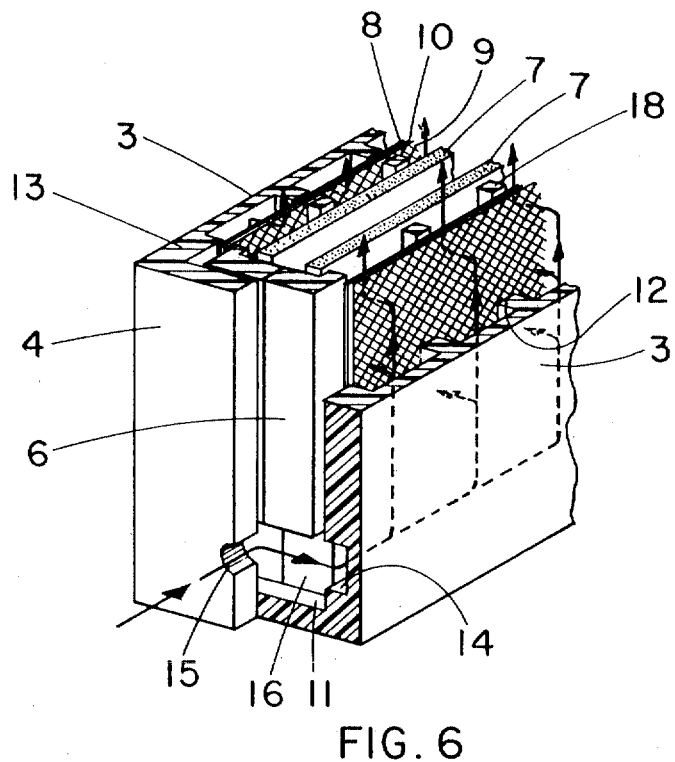

As shown most clearly in FIG. 2, each casing portion is also provided with a lower semicircular aperture designated at 15 and, in the assembled condition, such semicircular portions form the inlet for electrolyte. To provide for convenient flow of electrolyte to the interior of the casing and between the ribs 12, the frames 6 are cut out at 16, the electrolyte flow path afforded by this arrangement being clearly shown in FIG. 6.

The frames 6 have cut out window areas 17 which extend vertically with spacer bars 18, border an internal peripheral seat, are closed by the air porous cathode, and permit the passage of electrolyte to the cathode seated in the frames. The rims 19 of the frames communicate with longitudinally extending ledges 20 and the opposed ledges 20 of the two frames as well as the rims are sealed together in the assembled condition of the frames.

As shown most clearly in FIG. 4, the bars 18 may include slots 21 which extend through the bars and communicate adjacent fluid flow channels to inhibit against dead spots in the flow. Such slots 21 are not necessary but aid operation. Each frame 6 carries at its upper extremity a protuberance 22 and each protuberance is cut out in substantially a semicircle to provide for the receipt of an inlet pipe 24 in the assembled condition (FIG. 4) of the two frames 6. Additionally, bosses 25 on each of the two frames are provided to serve as precise spacer components in the fitting together of the frames 6. As most clearly shown in FIG. 3, the two frame portions 6 together constitute a framework which is retained as a unitary structure by a vertically extending line of adhesive 27. Adhesive 27 joins the frames 6 along the vertically extending rims 19 of the two frames.

The cathodes 7 are held in position on the frames 6 by suitably water resistant adhesive 28. Additionally, the composite of the plastic screen, the anode and the semipermeable diaphragm are retained on each frame 6 by a vertically extending strip of adhesive 30.

The casing 2 in its end wall 4 and at the upper area of such end wall is provided with an opening defined by the semicircular cutouts 31 (FIG. 2). In the assembled condition the cutouts 31 cooperate to provide the outlet opening of the device.

Figure 1:
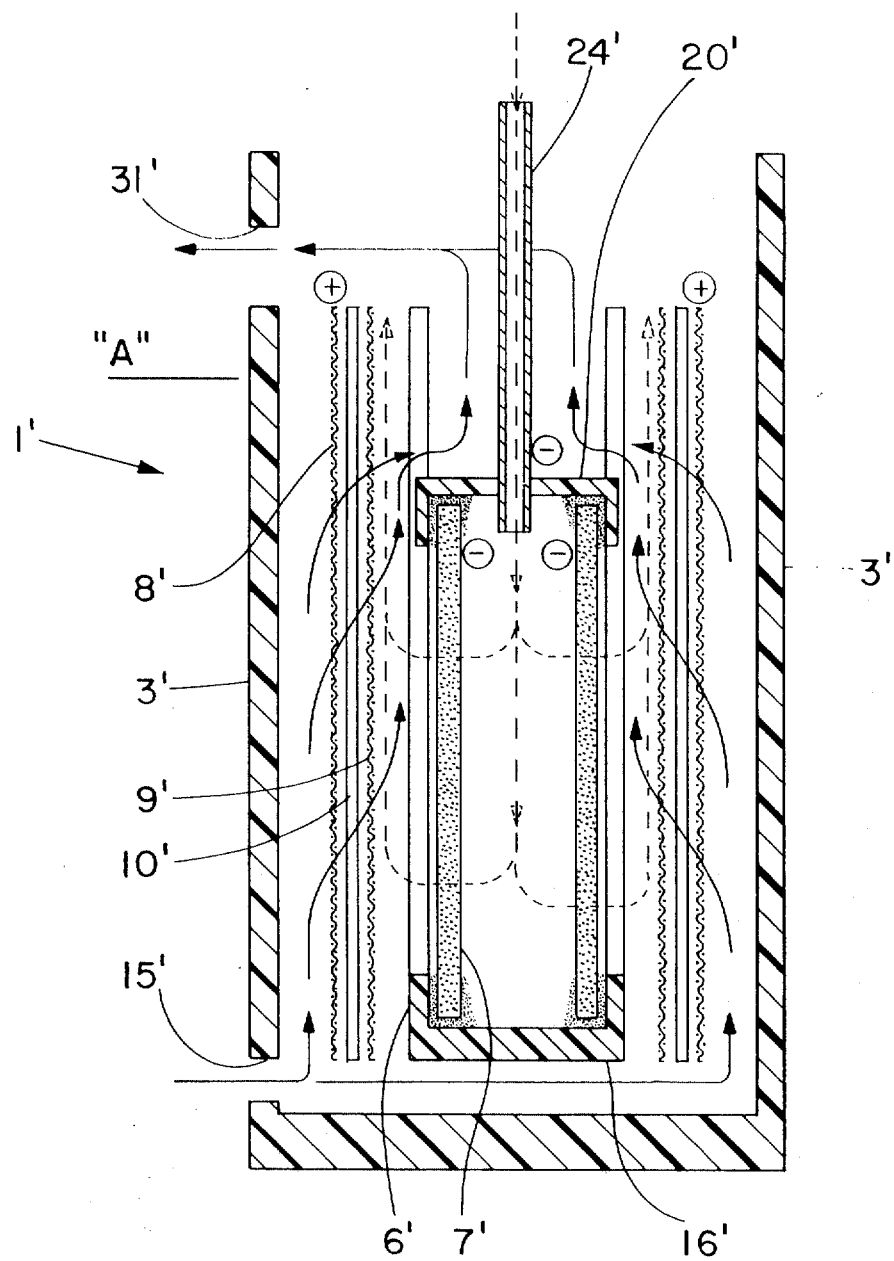
FIG. 1 is a diagrammatic view illustrating electrolyte flow paths in an electrochemical device in general accordance with the invention.

Referring now to FIG. 1, the parts therein which generally correspond to those of the specific structural arrangement of FIGS. 2–6 inclusive have been assigned the same numeral but primed. Additionally, solid arrows indicate the general nature of the electrolyte flow path while dashed lines, including headed arrows, indicate inlet oxygen (air) flow. More specifically, the electrolyte enters at 15', passes upwardly through the anode indicated by the plus sign. The semipermeable diaphragm and the plastic mesh contact on exposed surface of the cathode 7'. Air is introduced through the pipe 24' to the air chamber between the two cathodes 7', and the air passes through the cathodes to contact the flowing electrolyte.

In a further modification of the invention as illustrated in FIG. 5, dual inlet pipes 24' may be provided. Such dual pipes serve the same purpose as the single pipe but provide for the establishment of electrolyte in the device assembled.

In the drawing (FIG. 1) the inlet pipe 24' and the cathodes have been indicated to be negatively charged while both anodes have been indicated to be positively charged. This designation has been used as a matter of convenience to avoid complication of the drawings with unnecessary wiring.

The oxygen in known manner reacts with water of the inflowing alkaline electrolyte and, under the influence of electrical energy supplied to the cathode, reacts to provide hydroxyl and perhydroxyl ions. The electrolyte commonly for this purpose has a pH of at least 10, and a peroxide content of up to about 10 grams per liter of flowing solution can be obtained at relatively low power costs. The perhydroxyl is contained within the outflowing electrolyte stream at 31'. It is to be noted that, in the description of the specific structural arrangement as well as in the FIG. 1 description concerned primarily with electrolyte flow, the air chamber between the planar carbon electrodes is maintained substantially free of electrolyte even though the electrolyte level be that indicated by the "A." Thus, in effect, the cathodes seal the windows of the frames which mount the electrode structures and cooperate to provide a single framework adapted as the insert for the electrolytic device.

As many apparently widely different embodiments of this invention may be made without departing from the spirit and scope thereof, it is to be understood that I do not limit myself to the specific embodiments thereof except as defined in the appended claims.

We claim:

1. An electrochemical device including an electrolytic cell comprising an electrically nonconductive casing having a spacing for retention of electrolyte; a unitized insert electrode structure within said spacing and including: a framework defining an air chamber which is communicable with said electrolyte spacing through an opening of the framework, a gas diffusion cathode supported by said framework closing the said opening and adapted to inhibit liquid flow to said air chamber from said spacing, an anode supported by said framework and fronting on said electrolyte spacing, a semipermeable diaphragm also supported by said framework between said anode and cathode; and said unitized insert electrode structure resting within the electrolyte spacing in close engagement with the said casing and being separable therefrom as a unit.

2. An electrochemical device according to claim 1 in which the casing has a lower inlet opening for the passage of liquid electrolyte to said anode, said permeable diaphragm and across a face of said gas diffusion cathode, and said unitized insert electrode structure has an air inlet to said air chamber for continuous flow of air to said gas diffusion cathode, said casing being open upwardly for movement of liquid and gas outwardly of said device.

3. An electrochemical device according to claim 2 in which the unitized insert electrode structure has a pair of planar cathodes and the framework has a pair of frames, one supporting each cathode on opposite sides of the said air chamber, each said frame also supporting on an outer side thereof an anode for cooperation with an adjacent cathode, and a semipermeable diaphragm between each cathode-anode arrangement and supported on the outer side of a said frame.

4. An electrochemical device according to claim 1 in which the framework of the unitized insert electrode structure includes a frame having an internal seat and the cathode is planar and received fixedly on said seat.

5. An electrochemical device according to claim 1 in which the device includes a pair of electrolytic cells each having a planar cathode, an anode and a semipermeable membrane, and the framework includes a pair of similar frames, each of said frames retaining the components of a cell and the frames being united to define the air chamber between the cells.

6. An electrochemical device according to claim 5 in which the air chamber has a pair of air inlets.

7. An electrochemical device according to claim 1 in which the casing has vertically extending ribs defining vertically extending channels for electrolyte flow and unitized insert electrode structure abuts said ribs, and said ribs have cutouts communicating adjacent vertically extending channels.

8. An electrochemical device according to claim 1 in which the casing has a lower inlet opening for electrolyte passage and the framework is cut out adjacent said passage to accommodate said electrolyte flow around the framework.